United States Patent [19]

Skappel

[11] 4,393,890
[45] Jul. 19, 1983

[54] METHOD AND DEVICE FOR AUTOMATIC IRRIGATION

[76] Inventor: Einar Skappel, Kvartaervaegen 12, SE 595 00 Mjoelby, Sweden

[21] Appl. No.: 224,225

[22] PCT Filed: Oct. 22, 1979

[86] PCT No.: PCT/SE79/00213

§ 371 Date: Jun. 23, 1980

§ 102(e) Date: Feb. 22, 1980

[87] PCT Pub. No.: WO80/00777

PCT Pub. Date: May 1, 1980

[51] Int. Cl.³ ............................................. F16K 17/36
[52] U.S. Cl. ..................................... 137/78.2; 137/79; 251/44; 47/48.5
[58] Field of Search ................... 137/78.2, 79, 80, 43, 137/44; 47/48.5; 251/44; 239/75

[56] References Cited

U.S. PATENT DOCUMENTS

| | | | |
|---|---|---|---|
| 2,965,117 | 12/1960 | Gallacher | 137/78.2 |
| 3,006,554 | 10/1961 | Harris | 137/78.2 |
| 3,224,676 | 12/1965 | Rauchwerger | 137/78.2 |
| 3,422,833 | 1/1969 | Kitrilakis | 137/78.2 |
| 3,696,827 | 10/1972 | Sterlich | 137/78.2 |
| 3,900,134 | 8/1975 | Larson | 137/78.2 |

FOREIGN PATENT DOCUMENTS 353210 1/1973 Sweden .

Primary Examiner—A. Michael Chambers

Attorney, Agent, or Firm—Flynn, Thiel, Boutell & Tanis

[57] ABSTRACT

A main valve (1) is connected into a pressurized water pipe for an irrigation installation and has a valve body (4) formed as a differential piston and with a through bore (5), said body being operated in both directions by means of the water pressure, the piston (4) in one end position closing the water pipe and in its other end position keeping it open. The piston (4) is guided to said end positions by means of a control valve (7) arranged to open or close a duct (6) starting from the major cylinder bore, thereby to cause the water present to actuate the piston (4). The control valve (7) is in turn controlled by rainfall onto, and evaporation from an upwardly open bowl (8), and a drop means (9) active during irrigation. The bowl (8) is part of a tipping means with two tipped end positions, controlled by the quantity of water in the bowl (8).

To achieve operation of the main valve (1) such that irrigation substantially takes place at night, and that the length of time between irrigation can be varied, the tipping means is supplemented by a closed air chamber (15) on the other side of the pivoting shaft (35), said chamber and bowl (8) having a common flat bottom (16) and mutual communication via a slit (17) at the bottom. By the volume change in the air enclosed in the air chamber (15), caused by the temperature difference between night and day, the quantity of water contained in the open bowl (8) and in the chamber (15) is displaced at night such that the tipping means tips over into a position opening the main valve (1).

9 Claims, 4 Drawing Figures

METHOD AND DEVICE FOR AUTOMATIC IRRIGATION

FIELD OF THE INVENTION

This invention relates to an automatic regulating device for an irrigation system.

BACKGROUND OF THE INVENTION

From the Swedish patent specification No. 353,210 it is known to provide irrigation apparatus connected to a water pipe with an automatic regulating device by means of which irrigation is coupled in for periods with adjustable length broken by waterless periods with a length dependent on the relative humidity of the surrounding air.

The known device comprises a main valve with a valve body formed as a differential piston having a small-bore central through duct to its major side a duct from this major side to a control valve which is arranged to close and open the main valve when it closes and opens said duct, as well as a pivoting means with an open bowl arranged to be supplied with water from a drop means controlled by the control valve and, as soon as the supplied amount of water has reached a limiting value to tip over and thereby actuate the control valve by a projecting portion such that it closes the main valve and the water flow to the drop means, keeping them closed until sufficient water has evaporated from the bowl so that the tipping means tips back again, the projecting portion disengaging the control valve so that the latter reopens the main valve and the water flow to the drop means.

It has been found desirable to arrange that irrigation takes place substantially at night, and that the length of the waterless periods will also be dependent on rainfall.

The present invention relates to a method fulfilling precisely these desires and an apparatus for carrying out the method.

The invention is described in detail hereinafter.

BRIEF DESCRIPTION OF THE DRAWINGS

The invention is clarified by the appended drawings in which.

DETAILED DESCRIPTION

Figure 1:
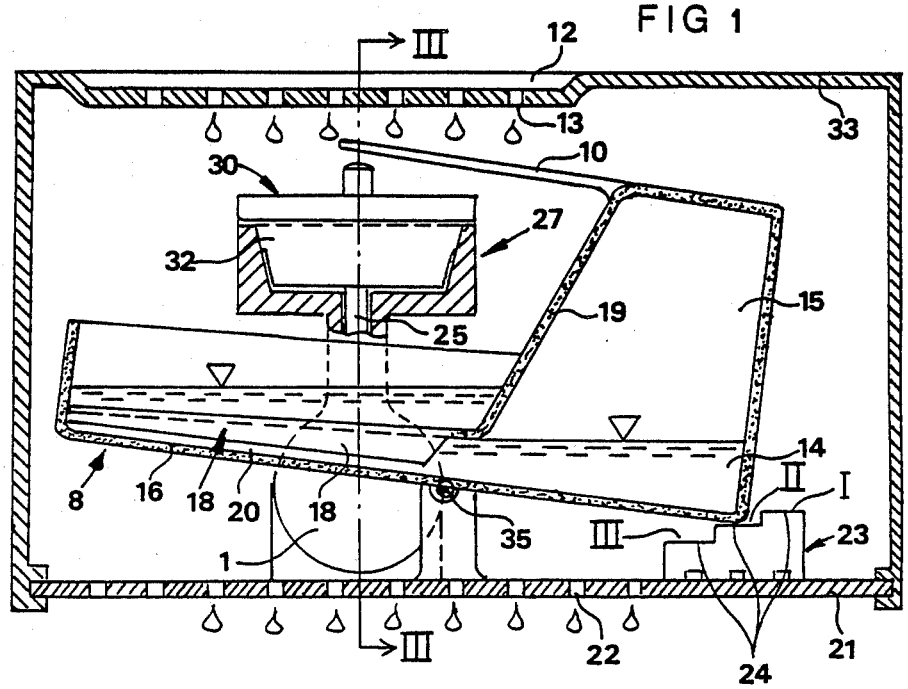
FIG. 1 is a longitudinal section through an embodiment of a device in accordance with the invention, in a position for irrigation.
Figure 2:
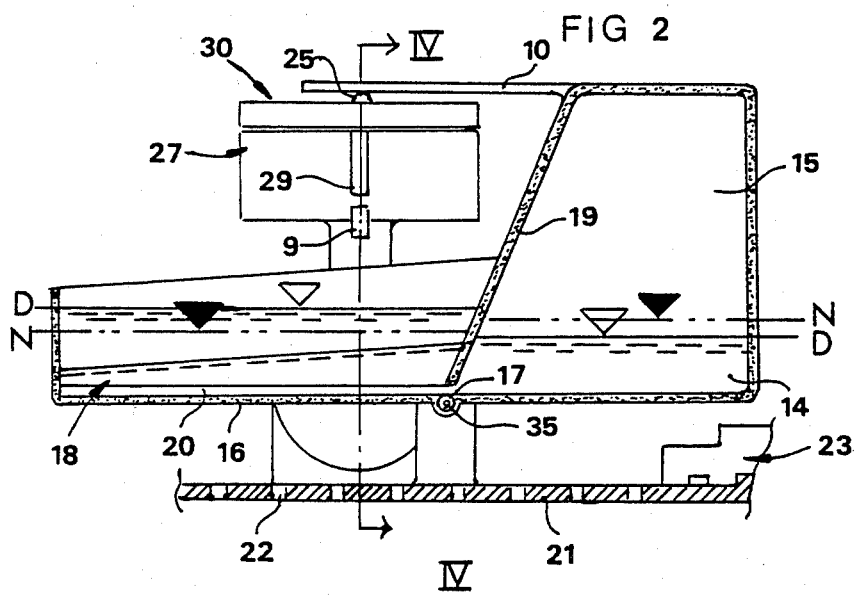
FIG. 2 illustrates a portion of the embodiment shown in FIG. 1 in a closed position.

A casing 11 enclosing the device is put together from two parts which slide into each other with a substantially flat bottom 21 having perforations 22 and a roof 33 provided with a rainwater collecting depression 12, the substantially flat bottom of which is provided with perforations 13.

Figure 3:
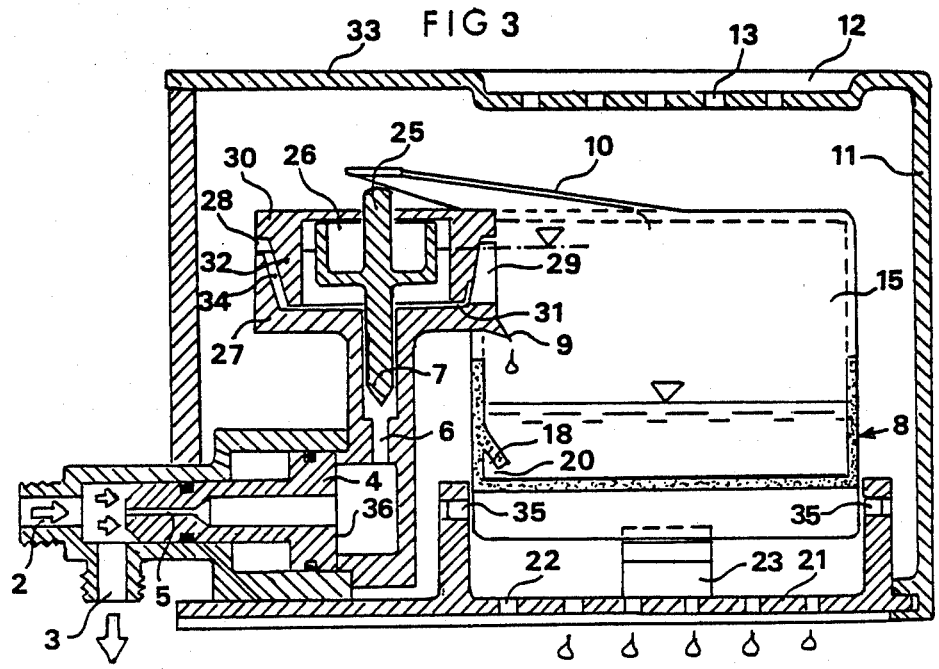
FIG. 3 is a section along the line III—III in FIG. 1.
Figure 4:
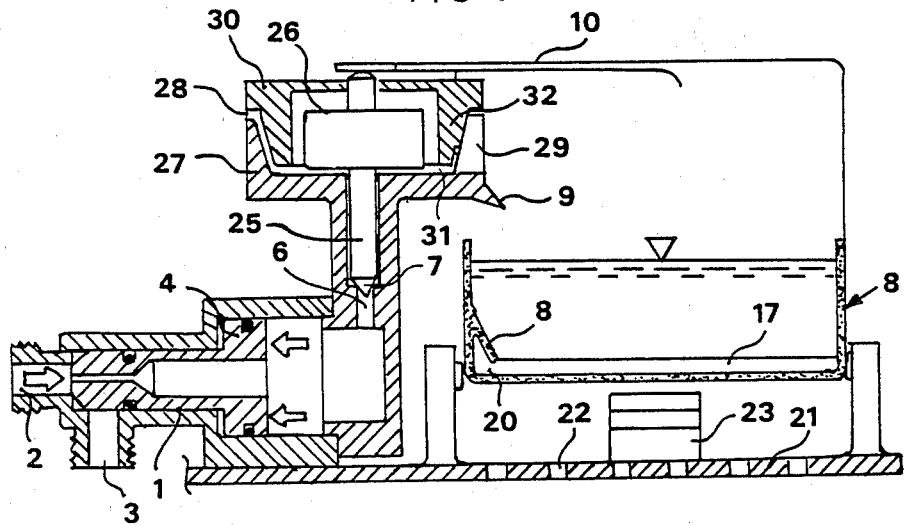
FIG. 4 is a section along the line IV—IV in FIG. 2.

The bottom 21 carries a main valve 1, with an inlet 2 projecting out of the casing 11 and arranged for connection to a water pipe (not shown), as well as an outlet 3 arranged fo connection to an irrigation apparatus, (not shown). The main valve 1 comprises a valve body 4 (FIG. 3) formed as a differential piston with a narrow gauge central bore 5 to its major side, from which a duct 6 goes substantially vertically to a control valve 7 with a vertical spindle 25 having a float 26 fastend thereto. The float is surrounded by an upwardly open circular bowl 27 with an overflow 28 and a side opening 29. The wall 34 of the bowl 27 diverges upwardly. A cover 30 with a central opening for the spindle 25 is provided with a dependent rim 32 fitting rotatably in the bowl 27 and with a narrow groove 31 opposite the side opening 29 of the bowl 27. The width of the groove 31 substantially corresponds to that of the side opening 29. Together, they constitute a through passage to a drop means 9 formed with a nose or spout and the cross-sectional area of said through passage can be regulated by turning the lid or cover 30 in the bowl 27.

In the casing there is a pivoting means, consisting of two bowls 8, 14 with a common flat bottom 16, one on either side of a pivoting shaft 35. Of these bowls, the one 8 is upwardly open and situated under the casing depression 12 and under the drop means 9. The other bowl 14 carries a closed air chamber 15 from the roof of which a projection 10 formed as an arm extends in over the spindle 25. The air chamber 15 is connected to the open bowl 8 by means of a narrow transverse slit 17 adjacent the common bottom 16, and by means of at least one duct 18 going to the opposite end of the open bowl 8 with a narrow lengthwise slit 20 adjacent the bottom 16. The cross section of the duct 18 can be optionally formed, all that is important is that its roof height rises continuously from being negligibly larger than the width of the slit 20 at the furthermost end of the open bowl 8 to a maximum at its opening into the air chamber 15, the height of the opening being determined by the quantity of water desired to be retained in the air chamber 15 and the air volume of the latter. The opening height must be somewhat larger than the sume of the width of the slits 17, 20 and the maximum difference in the day and night levels of the water in the air chamber 15.

On the bottom 21 of the casing 11 there is arranged a staircaseshaped block 23 under the air chamber end such that it can be displaced towards the pivoting shaft 35.

The apparatus functions in the following way:

Starting from the situation where the open bowl 8 is full of water and has caused the pivoting means to tip in a counter clockwise direction. The projecting portion of arm 10 engages the spindle 25 so that the latter presses the control valve 7 sealingly against its seating. In this mode, the pressure against the major side 36 of the differential piston 4 will be equal to the pressure in the water pipe and cause the main valve 1 to close the flow to the irrigation installation. The water in the float bowl 27 has dropped down from the drop means 9 into the open bowl 8, so that the float chamber 27 is empty and the weight of the float 26 coacts with the arm 10 to keep the control valve 7 in a closed position.

If a period of fine weather now occurs, the water in the open bowl 8 will evaporate and depart through the perforations 13. The pressure of the arm 10 against the spindle 25 is thus reduced, while the water enclosed in the air chamber 15 will remain substantially unaltered. For a given water level in the open bowl 8, the water pressure propagated via the through bore 5 in the differential piston 4, and the duct 6 to the control valve 7 will press against the control valve 7 so that it opens somewhat and lets water into the float bowl 27. The float 26 presses the spindle 25 upwards towards the arm 10 so that this causes the tilting means to tip over towards the air chamber side. Since the float bowl 27 is now filled to the overflow 28, water will pass out through the groove 31 and side opening 29 to the drop means 9, from which it drops down into the open bowl 8 at a rate which can be adjusted by turning the lid or cover 30. When the weight of water in the open bowl 8 has risen to a given value, it causes the tipping means to tip back again to the starting position, and via the arm 10 press the control valve 7 and main valve 1 to a closed position. The water in the float bowl 27 drops down into the open bowl 8 so that the float 26 will coact with the arm 10 to keep the valves 1 and 7 in a closed position, whereafter the sequence described above starts once again.

The air in the air chamber 15 naturally alters its temperature in accordance with that of the surroundings and thereby also its volume. This results in a portion of the water in the bottom basin of the air chamber 15 being pressed out into the open bowl 8 via the transverse slit 17 during the day and sucked back again during the night. In turn, this results in the tipping means being in an open position during irrigation times, i.e. tipped towards the air chamber side during the night and in a closed position during the day. Irrigation thus always takes place at night, which is just what is best for plant growth and the intention with the air chamber 15.

If the slit 17 were the only connection between the air chamber 15 and the open bowl 8, there would be difficulties in obtaining as much water in the air chamber 15 as required to obtain sharp and distinct motion from the closed (daytime) to open (nighttime) position. These difficulties are overcome by means of the duct 18, which enables water to be taken into the air chamber 15 such that its surface coincides with the top of the duct opening when the tipping means is tipped maximally over towards the air chamber side.

To adjust the maximum tipping of the tipping means towards the air chamber side, which determines the length of the irrigation periods, the block 23 is so displaceable that its steps 24 form stops limiting the tipping angle.

The embodiments of the invention in which an exclusive property or privilege is claimed are defined as follows:

1. A control apparatus for an irrigation system, comprising a container adapted to receive a quantity of a fluid, valve means having an inlet and an outlet and responsive to variations in the quantity of fluid in said container for respectively effecting and obstructing communication between said inlet and said outlet when the quantity of said fluid in said container is less than and greater than a predetermined amount, and temperature responsive means for varying the quantity of said fluid in said container in response to changes in the temperature of the ambient air, the quantity of fluid in said container being progressively decreased and increased as the ambient air temperature respectively decreases and increases, said temperature responsive means including a closed chamber partially filled with said fluid and partially filled with a gas, said gas having a volume which respectively increases and decreases as the temperature of said gas increases and decreases, and means for effecting fluid communication between a lower portion of said container and a lower portion of said chamber, a change in ambient air temperature effecting a change in the volume of said gas in said chamber, causing fluid to be drawn into or forced from said chamber through said means for effecting communication, the quantity of fluid in said container respectively increasing and decreasing as the quantity of fluid in said chamber decreases and increases.

2. A control apparatus for an irrigation system, comprising a container adapted to receive a quantity of a fluid, valve means having an inlet and an outlet and responsive to variations in the quantity of fluid in said container for respectively effecting and obstructing fluid communication between said inlet and said outlet when the quantity of said fluid in said container is less than and greater than a predetermined amount, and means for varying the quantity of said fluid in said container in response to changes in the temperature of the ambient air, the quantity of said fluid in said container being progressively decreased and increased as the ambient air temperature respectively decreases and increases, said means for varying the quantity of said fluid in said container including a closed chamber partially filled with said fluid and partially filled with a gas, said gas having a volume which respectively increases and decreases as the temperature of said gas increases and decreases, means for effecting fluid communication between a lower portion of said container and a lower portion of said chamber, and means supporting said container and said chamber for limited pivotal movement about and on opposite sides of a generally horizontal axis, movement of said container about said axis being in a generally vertical direction and bounded by a first position and a second position which is below said first position, and said valve means being responsive to movement of said container between said first and second positions, said valve means respectively effecting and obstructing fluid communication between said inlet and said outlet when said container is in said first and second positions.

3. A control apparatus for an irrigation system, comprising a container adapted to receive a quantity of a fluid; first means for facilitating evaporation of said fluid from said container; valve means having an inlet and an outlet for said fluid and responsive to variations in the quantity of said fluid in said container for respectively effecting and obstructing fluid communication between said inlet and said outlet when the quantity of said fluid in said container is less than and greater than a predetermined amount; second means for slowly supplying fluid to said container when said valve means is effecting fluid communication between said inlet and outlet; and third means for varying the quantity of said fluid in said container in response to changes in the temperature of the ambient air, the quantity of said fluid in said container being progressively decreased and increased as said ambient air temperature respectively decreases and increases, thereby rendering it more likely that the quantity of fluid in said container will drop below said predetermined amount and cause said valve means to effect fluid communication between said inlet an outlet during periods of reduced ambient air temperature, said third means including a closed chamber partially filled with said fluid and partially filled with a gas, the volume of said gas respectively increasing and decreasing as its temperature increases and decreases, and including fourth means for effecting fluid communication between a lower portion of said container and a lower portion of said chamber, whereby a change in ambient air temperature effects a change in the volume of said gas in said chamber, causing fluid to be drawn into or forced from said chamber through said fourth means, thereby effecting said variation of the quantity of said fluid in said container.

4. The apparatus according to claim 3, including means supporting said container and said chamber for limited pivotal movement about and on opposite sides of a generally horizontal axis, movement of said container about said axis being in a generally vertical direction and bounded by a first position and a second position which is below said first position, whereby variations in the relative amounts of fluid present in said container and said chamber due to evaporation and temperature changes produce weight shifts which effect movement of said container between said first and second positions; and wherein said valve means is responsive to movement of said container between said first and second positions, said valve means respectively effecting and obstructing fluid communication between said inlet and outlet when said container is in said first and second positions.

5. The apparatus according to claim 4, wherein said container and chamber share a common wall, said fourth means including a slit provided in a lower portion of said common wall, and including a duct communicating with said chamber through said common wall and communicating with said container at a location remote from said common wall, and a slit provided in the bottom of and extending the length of said duct.

6. The apparatus according to claim 4, wherein said valve means includes a main valve which effects fluid communication between said inlet and outlet when open and obstructs fluid communication between said inlet and outlet when closed, said main valve including a main valve chamber having a differential piston slidably supported therein for movement between first and second end positions, said piston being closest to one end of said main valve chamber when in said first end position, said inlet and outlet each communicating with said one end of said main valve chamber and said outlet being respectively obstructed and free from obstruction by said piston when said piston is in said first and second end positions, the end of said piston nearest said inlet having a smaller surface area than the opposite end thereof, and including a first passageway providing fluid communication between opposite ends of said main valve chamber; and wherein said valve means includes pilot valve means responsive to movement of said container for controlling said main valve, said pilot valve means causing said main valve to open when said container is in said first position and causing said main valve to close when said container is in said second position, said pilot valve means including an upwardly open bowl, a second passageway providing fluid communication between said bowl and the end of said main valve chamber opposite said one end thereof, said first passageway having a minimum cross-sectional area which is less than that of said second passageway, a float supported in said bowl for generally vertical movement between a third position and a fourth position below said third position, means for obstructing said second passageway when said float is in said fourth position, and means for urging said float into said fourth position when said container is in said second position.

7. The apparatus according to claim 6, including an overflow opening provided in an upper portion of said bowl to drain excess fluid from said bowl.

8. The apparatus according to claim 7, wherein said first means includes an opening in the upper portion of said container, and wherein said second means includes a supply opening in a side of said bowl, a drop lip adjacent the bottom of said supply opening in said bowl, said drop lip being disposed above said opening in said container, and a cover for said bowl having a dependent annular rim extending into said bowl in close proximity to the sides thereof, said rim having a narrow groove in the lower edge thereof which is alignable with said supply opening in said bowl to define a third passageway of relatively small diameter which provides fluid communication between said bowl and said drop lip, adjustment of the angular position of said cover relative to said bowl effecting regulation of the minimum cross-sectional area of said third passageway.

9. The apparatus according to claim 4, including adjustment means for selectively varying the angular location of said container about said axis when in said first position.

* * * * *